United States Patent
Morishima et al.

(10) Patent No.: US 11,752,710 B2
(45) Date of Patent: Sep. 12, 2023

(54) COMPOSITE MATERIAL, PULTRUSION DEVICE, AND PULTRUSION METHOD

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1136 days.

(21) Appl. No.: 16/304,174

(22) PCT Filed: Jul. 4, 2017

(86) PCT No.: PCT/JP2017/024548
§ 371 (c)(1),
(2) Date: Nov. 23, 2018

(87) PCT Pub. No.: WO2018/008652
PCT Pub. Date: Jan. 11, 2018

(65) Prior Publication Data
US 2020/0282672 A1    Sep. 10, 2020

(30) Foreign Application Priority Data
Jul. 6, 2016   (JP) ................................ 2016-134522

(51) Int. Cl.
*B29C 70/52*    (2006.01)
*B29C 70/14*    (2006.01)
(Continued)

(52) U.S. Cl.
CPC .............. *B29C 70/52* (2013.01); *B29C 70/14* (2013.01); *C08J 5/042* (2013.01);
(Continued)

(58) Field of Classification Search
CPC ..... B29C 70/52; B29C 70/526; B29C 70/527; B29D 99/0005; B29D 99/0003
See application file for complete search history.

(56) References Cited

U.S. PATENT DOCUMENTS 3,470,051 A * 9/1969 Meyer .................. B29C 70/521
156/171
3,657,040 A * 4/1972 Shobert ................. F41B 5/0005
156/178

(Continued)

FOREIGN PATENT DOCUMENTS

EP    0402309 A1    12/1990
EP    2006074 A1    12/2008
(Continued)

OTHER PUBLICATIONS

Supplementary European Search Report for European Application No. 17824255.8 dated Jun. 11, 2019; 10pp.
(Continued)

*Primary Examiner* — Andrew D Graham
(74) *Attorney, Agent, or Firm* — HAUPTMAN HAM, LLP (57) ABSTRACT

A pultrusion material serves as a composite material having a reinforced part that is a part reinforced against a load acting in a load direction. The reinforced part includes: a core material that comprises bundled reinforcing fibers and that is provided so as to extend along the load direction; and a cover section obtained by covering the circumference of
(Continued)

the core material with a fiber sheet. The fiber direction of the reinforcing fibers in the core material is oriented along the load direction.

4 Claims, 5 Drawing Sheets

(51) Int. Cl.
    *C08J 5/04*              (2006.01)
    *B29K 63/00*           (2006.01)
    *B29K 307/04*         (2006.01)

(52) U.S. Cl.
    CPC ...... *B29K 2063/00* (2013.01); *B29K 2307/04* (2013.01); *C08J 2363/00* (2013.01)

(56) References Cited

U.S. PATENT DOCUMENTS

| | | | | |
|---|---|---|---|---|
| 3,689,343 A | * | 9/1972 | Elsner | B29C 70/28 156/179 |
| 3,900,357 A | * | 8/1975 | Huchette | B29C 70/865 156/185 |
| 3,915,618 A | * | 10/1975 | Feucht | B29C 63/065 425/503 |
| 3,960,473 A | * | 6/1976 | Harris | B29C 70/526 425/467 |
| 4,038,018 A | * | 7/1977 | Pepmeier | B29C 70/526 425/505 |
| 4,312,162 A | | 1/1982 | Medney | |
| 4,347,287 A | * | 8/1982 | Lewis | B29C 70/525 264/136 |
| 4,445,957 A | * | 5/1984 | Harvey | B29C 43/08 156/180 |
| RE32,254 E | * | 9/1986 | Daws | B29C 53/52 264/119 |
| 4,680,224 A | * | 7/1987 | O'Connor | B29C 70/521 427/430.1 |
| 4,700,647 A | | 10/1987 | Pabsch | |
| 4,758,024 A | * | 7/1988 | Kaempen | B29C 53/564 285/319 |
| 4,883,552 A | * | 11/1989 | O'Connor | B29C 70/525 156/180 |
| 4,892,764 A | * | 1/1990 | Drain | B29C 35/02 156/161 |
| 4,983,453 A | * | 1/1991 | Beall | B29C 70/083 156/179 |
| 5,122,417 A | * | 6/1992 | Murakami | B29C 70/525 428/371 |
| 5,127,980 A | * | 7/1992 | Cavin | B29C 70/52 156/180 |
| 5,182,060 A | * | 1/1993 | Berecz | B29C 53/043 264/70 |
| 5,198,172 A | * | 3/1993 | Spoo | B29C 33/306 156/180 |
| 5,205,898 A | * | 4/1993 | Wilson | B29B 15/125 118/124 |
| 5,439,215 A | * | 8/1995 | Ratchford | B29C 70/527 473/561 |
| 5,585,155 A | * | 12/1996 | Heikkila | B29C 70/08 428/34.1 |
| 5,593,536 A | * | 1/1997 | Kaiser | B29C 70/081 156/180 |
| 5,650,109 A | * | 7/1997 | Kaiser | B29C 70/081 264/136 |
| 5,650,229 A | * | 7/1997 | Gross | B29D 99/0003 428/370 |
| 5,820,804 A | * | 10/1998 | Elmaleh | B29C 70/504 264/167 |
| 5,866,253 A | * | 2/1999 | Philipps | B29C 70/521 428/374 |
| 5,876,553 A | * | 3/1999 | Kaiser | B29C 70/525 156/433 |
| 5,993,713 A | | 11/1999 | de la Puerta et al. | |
| 6,116,113 A | * | 9/2000 | Pazdirek | B29C 70/207 57/230 |
| 6,197,412 B1 | * | 3/2001 | Jambois | B29C 48/12 428/297.4 |
| 6,221,295 B1 | * | 4/2001 | Kaiser | E04C 5/03 264/145 |
| 9,415,577 B1 | * | 8/2016 | Sutkus | B29D 99/0003 |
| 9,855,702 B1 | * | 1/2018 | Olberg | B29C 48/12 |
| 2002/0014302 A1 | | 2/2002 | Fanucci | B32B 37/22 156/179 |
| 2002/0054984 A1 | * | 5/2002 | Winget | B29C 70/025 428/292.1 |
| 2002/0056508 A1 | * | 5/2002 | Brandstrom | B29C 70/525 156/180 |
| 2002/0063349 A1 | * | 5/2002 | Edwards | G02B 6/04 264/1.28 |
| 2002/0088549 A1 | * | 7/2002 | Fanucci | B29C 70/528 156/441 |
| 2003/0194528 A1 | * | 10/2003 | Sakonjo | B29C 70/50 428/90 |
| 2004/0079931 A1 | | 4/2004 | Climente | |
| 2004/0211151 A1 | * | 10/2004 | Fanucci | B29C 70/525 52/745.19 |
| 2006/0087059 A1 | * | 4/2006 | Boissonnat | B29B 15/122 264/555 |
| 2007/0125301 A1 | * | 6/2007 | Zhou | B29C 70/523 118/400 |
| 2007/0126142 A1 | * | 6/2007 | Zhou | B29C 70/523 264/134 |
| 2008/0185756 A1 | * | 8/2008 | Wilkerson | B29C 43/22 264/297.4 |
| 2009/0050263 A1 | * | 2/2009 | Suzuki | B29B 11/16 156/245 |
| 2009/0243151 A1 | * | 10/2009 | Aijima | B29C 70/526 264/280 |
| 2010/0064946 A1 | * | 3/2010 | Watson | B29C 48/08 108/57.25 |
| 2011/0048624 A1 | * | 3/2011 | Nitsch | B29C 70/465 156/228 |
| 2011/0049750 A1 | * | 3/2011 | Bechtold | B29C 70/521 264/177.1 |
| 2012/0196083 A1 | * | 8/2012 | Hanawa | B29D 99/0007 428/130 |
| 2012/0237736 A1 | * | 9/2012 | Blot | B29C 70/52 428/178 |
| 2013/0062808 A1 | * | 3/2013 | Bremmer | B29D 99/0005 264/163 |
| 2013/0105072 A1 | * | 5/2013 | Anderson | B29D 99/0007 156/264 |
| 2014/0030453 A1 | * | 1/2014 | Brandt | B29C 43/224 428/34.1 |
| 2014/0155540 A1 | * | 6/2014 | Imai | B29C 70/521 524/540 |
| 2014/0216638 A1 | * | 8/2014 | Vetter | B29D 99/0005 156/227 |
| 2015/0017437 A1 | * | 1/2015 | Kenny | B29C 70/523 428/367 |
| 2015/0321429 A1 | * | 11/2015 | Soula | B29D 99/0046 156/242 |
| 2015/0360396 A1 | * | 12/2015 | Thomas | B64C 1/12 428/221 |
| 2015/0376946 A1 | * | 12/2015 | Kurzer | B29C 65/70 182/194 |
| 2016/0009035 A1 | * | 1/2016 | Zarfos | H05B 6/106 219/634 |
| 2016/0303776 A1 | * | 10/2016 | Oefner | B29C 53/14 |
| 2017/0274561 A1 | * | 9/2017 | Ong | B29B 15/122 |
| 2018/0311916 A1 | * | 11/2018 | Wilkerson | B29C 70/526 |

FOREIGN PATENT DOCUMENTS

| | | | |
|---|---|---|---|
| FR | 2408448 A1 | 6/1979 | |
| JP | S463445 A | 10/1971 | |

(56) References Cited

FOREIGN PATENT DOCUMENTS

| | | |
|---|---|---|
| JP | S57151667 A | 9/1982 |
| JP | 2004352187 A | 12/2004 |
| JP | 2005009307 A | 1/2005 |

OTHER PUBLICATIONS

International Search Report and Written Opinion for International Application No. PCT/JP2017/024548 dated Aug. 29, 2017; 13pp.

* cited by examiner

COMPOSITE MATERIAL, PULTRUSION DEVICE, AND PULTRUSION METHOD

RELATED APPLICATIONS

The present application is a National Phase of International Application Number PCT/JP2017/024548 filed Jul. 4, 2017 and claims priority to Japanese Patent Application 2016-134522 filed Jul. 6, 2016.

TECHNICAL FIELD

The present invention relates to a composite material having a reinforced part formed therein, a pultrusion device, and a pultrusion method.

BACKGROUND ART

In the related art, a plate-shaped structure having a reinforcing part formed therein is known (refer to, for example, PTL 1). In this plate-shaped structure, the reinforcing part has a solid rod-shaped portion having a core material in the interior thereof. The core material is made of a composite material and is formed by winding a prepreg into a rod shape.

CITATION LIST

Patent Literature

[PTL 1] Japanese Unexamined Patent Application Publication No. 2004-352187

SUMMARY OF INVENTION

Technical Problem

However, in the core material of PTL 1, the core material is formed by winding a prepreg into a rod shape, and therefore, although the core material is provided along a longitudinal direction, in reinforcing fibers which are included in the core material, a fiber direction thereof is not provided along the longitudinal direction, and thus the fiber direction of the reinforcing fiber is not in an appropriate direction with respect to a load which is applied in the longitudinal direction.

Therefore, the present invention has an object to provide a composite material suitably reinforced against a load, a pultrusion device, and a pultrusion method.

Solution to Problem

According to an aspect of the present invention, there is provided a composite material including: a reinforced part which is a part reinforced against a load acting in a load direction, in which the reinforced part includes a core part which includes reinforcing fibers in which a fiber direction is oriented along the load direction, and is provided to extend along the load direction, and a covering part formed by covering a periphery of the core part with a fiber sheet.

According to this configuration, the fiber direction of each of the reinforcing fibers which are included in the core part can be oriented along the load direction, and therefore, a load which is applied to the reinforced part can be adequately received by the core part. For this reason, the load can be adequately received at the reinforced part, so that a load due to the load can be reduced at parts other than the reinforced part, and thus a plate thickness or the like can be reduced, so that the weight of the entire composite material can be reduced. It is favorable that the fiber direction of the reinforcing fiber which is a main component of the core part is oriented along the load direction, and the core part may include reinforcing fibers having a fiber direction different from the load direction.

Further, it is preferable that when in a cross section taken along a plane orthogonal to the load direction, a neutral axis extending in a predetermined direction is set to be a first neutral axis and a neutral axis extending in a direction orthogonal to the first neutral axis is set to be a second neutral axis, the reinforced part is a part farthest from an intersection of the first neutral axis and the second neutral axis.

According to this configuration, a part farthest from the intersection is reinforced, whereby it is possible to reinforce a part where stress due to bending moment to the composite material centered on the intersection becomes larger. For this reason, it is possible to more suitably perform reinforcement against a load.

Further, it is preferable that the reinforced part is provided in at least one of a tip portion which is a free end and a corner portion which is bent, in a cross section taken along a plane orthogonal to the load direction.

According to this configuration, it is possible to more suitably reinforce the tip portion where stress due to bending moment to the composite material becomes larger, or the corner portion where stress due to a load becomes larger.

According to another aspect of the present invention, there is provided a pultrusion device for forming a composite material having a reinforced part which is a part reinforced against a load acting in a load direction, while drawing the composite material in a drawing direction, the reinforced part including a core part which includes reinforcing fibers and is provided to extend along the load direction, and a covering part formed by covering a periphery of the core part with a fiber sheet, the pultrusion device including: a molding tool which forms the composite material having the reinforced part, by drawing the reinforcing fibers and the fiber sheet along the drawing direction, in which the molding tool includes a core part guide part for bundling and guiding the reinforcing fibers so as to form the core part, and a covering part guide part for guiding the fiber sheet so as to cover the periphery of the core part.

Further, according to still another aspect of the present invention, there is provided a pultrusion method of forming a composite material having a reinforced part which is a part reinforced against a load acting in a load direction, while drawing the composite material in a drawing direction, the reinforced part including a core part which includes reinforcing fibers and is provided to extend along the load direction, and a covering part formed by covering a periphery of the core part with a fiber sheet, the pultrusion method including: a pultrusion step of forming the composite material having the reinforced part, by drawing the reinforcing fibers and the fiber sheet along the drawing direction, in which in the pultrusion step, the periphery of the core part is covered with the fiber sheet while the core part is formed by bundling the reinforcing fibers.

According to these configurations, the fiber direction of each of the reinforcing fibers which are included in the core part can be oriented along the load direction, and therefore, a load which is applied to the reinforced part can be adequately received by the core part. For this reason, the load can be adequately received at the reinforced part, so that a load due to the load can be reduced at parts other than the reinforced part, and thus a plate thickness or the like can be reduced, so that the weight of the entire composite material can be reduced.

Further, it is preferable that in the pultrusion step, a sheet folding step of folding the fiber sheet so as to cover the periphery of the core part is performed.

According to this configuration, by folding the fiber sheet while drawing the fiber sheet, it is possible to easily cover the periphery of the core part with the fiber sheet.

DESCRIPTION OF EMBODIMENTS

Hereinafter, embodiments of the present invention will be described in detail based on the drawings. The present invention is not limited by the embodiments. Further, constituent elements that can be easily replaced by those skilled in the art, or constituent elements that are substantially identical to the constituent elements in the following embodiments are included in the constituent elements in the following embodiments. Further, the constituent elements described below can be appropriately combined, and in a case where there are a plurality of embodiments, it is also possible to combine the respective embodiments.

Embodiment 1

Figure 1:
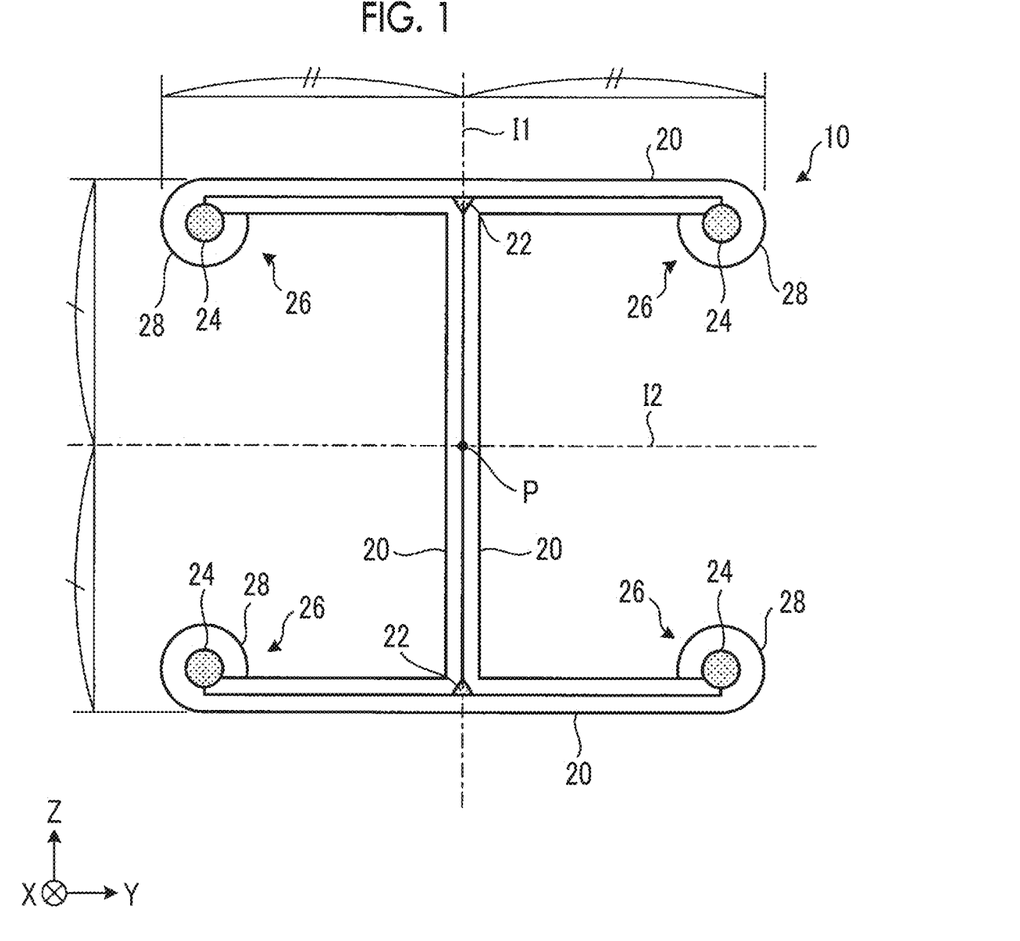
FIG. 1 is a sectional view schematically showing an example of a composite material according to Embodiment 1.
Figure 2:
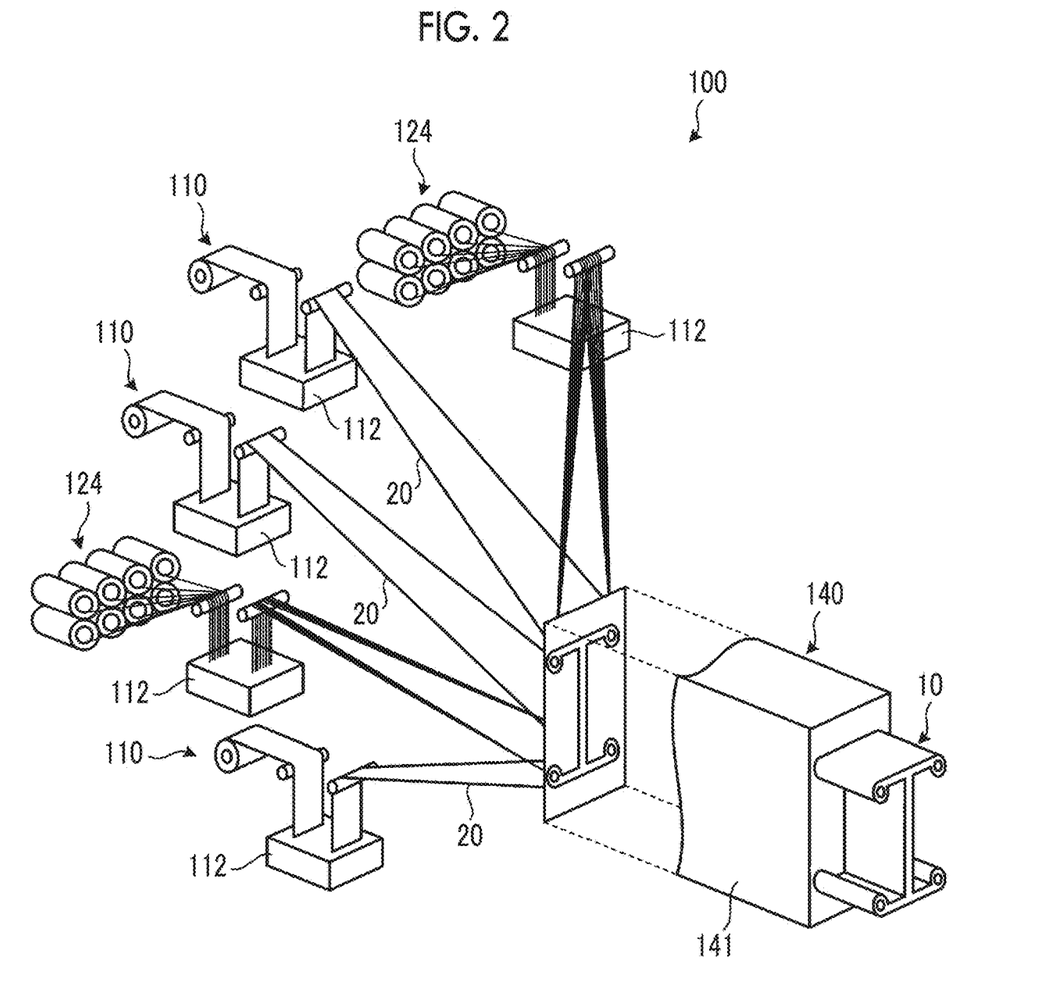
FIG. 2 is a schematic configuration diagram showing an example of a pultrusion device according to Embodiment 1.
Figure 3:
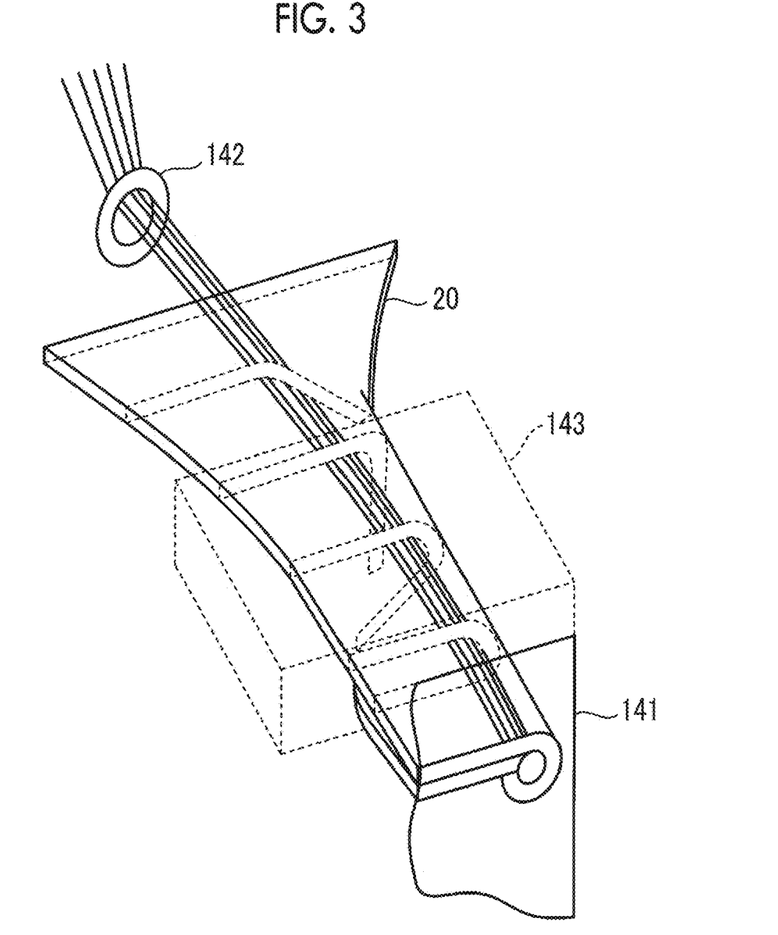
FIG. 3 is a schematic configuration diagram showing the periphery of a molding tool of the pultrusion device according to Embodiment 1.
Figure 4:
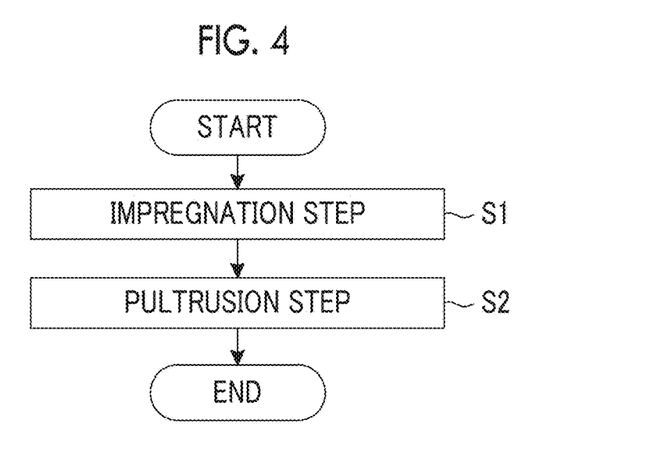
FIG. 4 is a flowchart relating to a pultrusion method according to Embodiment 1.

FIG. 1 is a sectional view schematically showing an example of a composite material according to Embodiment 1. FIG. 2 is a schematic configuration diagram showing an example of a pultrusion device according to Embodiment 1. FIG. 3 is a schematic configuration diagram showing the periphery of a molding tool of the pultrusion device according to Embodiment 1. FIG. 4 is a flowchart relating to a pultrusion method according to Embodiment 1.

The composite material according to Embodiment 1 is a pultrusion material 10 pultruded along a longitudinal direction which is an X-axis direction shown in FIG. 1, and has a shape extending in the X-axis direction. The pultrusion material 10 is formed in a predetermined shape in a Y-Z plane shown in FIG. 1, that is, in a cross section orthogonal to the longitudinal direction. In Embodiment 1, the pultrusion material 10 is formed in an H shape in cross section. However, there is no limitation thereto, and the pultrusion material 10 may be formed in any shape such as an I shape, a T shape, a concave shape, and a cylindrical shape.

The pultrusion material 10 includes a plurality of fiber sheets 20, a gap material 22, and a core material (a core part) 24, as shown in FIG. 1. Further, in the pultrusion material 10, a reinforced part 26 which is a part reinforced against a load acting in a load direction is formed. Although details will be described later, the reinforced part 26 is formed of a part of the fiber sheet 20 and the core material 24.

The plurality of fiber sheets 20 are formed in a sheet shape extending in the X-axis direction and are deformed so as to have a predetermined shape (in FIG. 1, an H shape) in the Y-Z plane during the pultrusion. The fiber sheet 20 is a composite material which includes reinforcing fibers and thermosetting resin impregnated in the reinforcing fibers. For each of the fiber sheets 20, for example, a fiber sheet is used in which a plurality of layers of reinforcing fibers oriented in a predetermined fiber direction are laminated and fiber directions in which the fiber directions in the respective layers are set to be different from each other are multi-directional. Here, in Embodiment 1, as the reinforcing fibers, for example, carbon fibers are applied. However, there is no limitation to the carbon fibers, and glass fibers or the like may also be applied. Further, in Embodiment 1, as the thermosetting resin, for example, epoxy resin is applied. However, there is no limitation to the epoxy resin, and other thermosetting resin may also be applied.

The gap material 22 is disposed in a gap which is formed by the plurality of fiber sheets 20. In Embodiment 1, as the gap material 22, a material obtained by impregnating reinforcing fibers such as carbon fibers with resin and bundling the reinforcing fibers is applied. The gap material 22 is not limited thereto, and a material obtained by appropriately combining other reinforcing fibers and the thermosetting resin may also be applied.

Next, the reinforced part 26 which is formed in the pultrusion material 10 will be described with reference to FIG. 1. The reinforced part 26 is a part reinforced against a load in which a load direction is the longitudinal direction of the pultrusion material 10. When in the cross section of the pultrusion material 10 shown in FIG. 1, a neutral axis extending in a predetermined direction is set to be a first neutral axis I1 and a neutral axis extending in a direction orthogonal to the first neutral axis I1 is set to be a second neutral axis 12, the reinforced part 26 is a part farthest from an intersection P of the first neutral axis I1 and the second neutral axis 12. Here, the first neutral axis I1 is an axis passing through the center of the pultrusion material 10 in a right-left direction of FIG. 1, and the second neutral axis 12 is an axis passing through the center of the pultrusion material 10 in an up-down direction of FIG. 1. For this reason, the intersection P is a so-called centroid. Specifically, the reinforced part 26 is provided at each of four tip portions which are free ends of the pultrusion material 10 having an H shape.

The reinforced part 26 has the core material 24 and a covering part 28 covering the periphery of the core material 24. The core material 24 is a cylindrical member in which an axial direction thereof is the longitudinal direction of the pultrusion material 10. The core material 24 is formed by bundling reinforcing fibers such as carbon fibers and impregnating the bundled reinforcing fibers with resin. The fiber direction of each of the reinforcing fibers which are included in the core material 24 is oriented along the longitudinal direction (that is, the load direction). In the core material 24, it is favorable that the fiber direction of the reinforcing fiber which is a main component of the core material 24 is oriented along the load direction, and the core material 24 may include reinforcing fibers having a fiber direction different from the load direction.

The covering part 28 is at least a part of the fiber sheet 20 configuring the pultrusion material 10 and is provided so as to cover the outer peripheral surface of the core material 24. For this reason, as reinforcing fibers which are included in the covering part 28, reinforcing fibers in which a fiber direction thereof is oriented along a direction different from the longitudinal direction are included therein. Here, the fiber direction of each of the reinforcing fibers disposed on the inner peripheral surface of the covering part 28, which is in contact with the outer peripheral surface of the core material 24, is set to be a direction other than 90° with respect to the fiber direction in the core material 24. For this reason, the fiber direction of the reinforcing fiber disposed on the outer peripheral surface of the core material 24 and the fiber direction of the reinforcing fiber disposed on the inner peripheral surface of the covering part 28 are not orthogonal to each other, so that a decrease in interlaminar strength of the core material 24 and the covering part 28 is suppressed.

Next, a pultrusion device 100 will be described with reference to FIG. 2. The pultrusion device 100 is a device for forming the pultrusion material 10 while drawing the pultrusion material 10 in a drawing direction. At this time, the drawing direction is the same direction as the longitudinal direction of the pultrusion material 10 and is the same direction as the load direction of a load which is applied to the pultrusion material 10.

As shown in FIG. 2, the pultrusion device 100 includes a plurality of fiber sheet supply units 110, a plurality of resin pools 112, a plurality of core material supply units 124, and a molding tool 140. In FIG. 2, the illustration of a gap material supply unit that supplies the gap material 22 is omitted.

The fiber sheet supply unit 110 is for supplying the fiber sheet 20 toward the molding tool 140. The fiber sheet supply unit 110 feeds out the fiber sheet 20 in a wound dry state (that is, a state where the fiber sheet 20 is not impregnated with the thermosetting resin). Here, the fiber sheet supply unit 110 is appropriately installed by the number of fiber sheets 20 which are used for the pultrusion material 10 to be formed. However, as the fiber sheet 20 which is fed out by the fiber sheet supply unit 110, a fiber sheet (a prepreg or the like) already impregnated with resin may be used.

The core material supply unit 124 is for supplying the reinforcing fibers which are included in the core material 24 toward the molding tool 140. The core material supply unit 124 feeds out a plurality of reinforcing fibers in a wound dry state. However, the reinforcing fibers which are fed out by the core material supply unit 124 may be reinforcing fibers already impregnated with resin.

The resin pool 112 is a pool that stores thermosetting resin, and a plurality of resin pools 112 are provided according to the number of fiber sheet supply units 110 and the number of core material supply units 124. The resin pool 112 impregnates the fiber sheet 20 fed out from the fiber sheet supply unit 110 and the reinforcing fibers fed out from the core material supply unit 124 with thermosetting resin to make the fiber sheet 20 and the reinforcing fibers be in a wet state (that is, a state of being impregnated with thermosetting resin). However, in a case where the fiber sheet 20 which is fed out by the fiber sheet supply unit 110 is a fiber sheet (a prepreg or the like) already impregnated with resin, and in a case where the reinforcing fibers which are fed out by the core material supply unit 124 are in a state of being already impregnated with resin, the fiber sheet 20 and the reinforcing fibers are directly supplied from the fiber sheet supply unit 110 and the core material supply unit 124 to the molding tool 140.

As shown in FIGS. 2 and 3, the molding tool 140 forms the pultrusion material 10 having the reinforced part 26 by drawing the reinforcing fibers and the fiber sheet 20 in a wet state along the drawing direction.

The molding tool 140 includes a tool main body 141, a core part guide part 142, and a covering part guide part 143. The tool main body 141 has a heating part (not shown) and thermally cures the thermosetting resin which is included in the reinforcing fibers and the fiber sheet 20 in a wet state, thereby forming the pultrusion material 10.

The core part guide part 142 is provided on the inlet side of the tool main body 141 and guides the reinforcing fibers bundled so as to form the core material 24, toward the inlet side of the tool main body 141. The core part guide part 142 is formed in an annular shape, for example, and bundles the reinforcing fibers by passing the reinforcing fibers to become the core material 24 through the inside of a circular ring.

The covering part guide part 143 is provided on the inlet side of the tool main body 141 and guides the core material 24 wound by at least a part of the fiber sheet 20 such that the covering part 28 covering the periphery of the core material 24 is formed, toward the inlet side of the tool main body 141.

Next, a series of operations relating to a method of pultruding the pultrusion material 10 using the pultrusion device 100 described above will be described with reference to FIG. 4. As shown in FIG. 4, in the pultrusion method, an impregnation step S1 and a pultrusion step S2 are performed in order.

In the impregnation step S1, the fiber sheet 20 in a dry state fed out from the fiber sheet supply unit 110 is immersed in the resin pool 112, so that the fiber sheet 20 is impregnated with thermosetting resin. Further, in the impregnation step S1, the reinforcing fibers in a dry state fed out from the core material supply unit 124 are immersed in the resin pool 112, so that the reinforcing fibers are impregnated with thermosetting resin. However, in a case where the fiber sheet 20 which is fed out from the fiber sheet supply unit 110 is a fiber sheet (a prepreg or the like) already impregnated with resin, and in a case where the reinforcing fibers which are fed out from the core material supply unit 124 are in a state of being already impregnated with resin, the impregnation step S1 in the fiber sheet 20 and the reinforcing fibers is omitted. Further, although illustration is omitted, reinforcing fibers which are included in the gap material 22 are also likewise impregnated with thermosetting resin.

In the pultrusion step S2, the fiber sheet 20 and the reinforcing fibers, which are in a wet state, are guided to the tool main body 141 by the core part guide part 142 and the covering part guide part 143 while being drawn in the drawing direction. At this time, in the pultrusion step S2, as shown in FIG. 3, a sheet folding step of folding the fiber sheet 20 so as to cover the periphery of the core material 24 is performed. That is, in the pultrusion step S2, the reinforcing fibers are bundled and guided by the core part guide part 142, so that the core material 24 is formed, and in the sheet folding step, the fiber sheet 20 is folded by the covering part guide part 143, thereby covering the periphery of the core material 24. Then, the fiber sheet 20 and the reinforcing fibers are folded and deformed so as to form the H-shaped pultrusion material 10 having the reinforced parts 26, and are introduced into the tool main body 141. Further, in the pultrusion step S2, the H-shaped pultrusion material 10 having the reinforced parts 26 is formed by curing the thermosetting resin included in the fiber sheet 20 and the reinforcing fibers while drawing the fiber sheet 20 and the reinforcing fibers introduced into the tool main body 141 in the drawing direction.

As described above, according to Embodiment 1, the fiber direction of each of the reinforcing fibers which are included in the core material 24 can be oriented along the load direction, and therefore, a load which is applied to the reinforced part 26 can be adequately received by the core material 24. For this reason, the load can be adequately received at the reinforced part 26, so that a load due to the load can be reduced at parts other than the reinforced part 26, and thus a plate thickness or the like can be reduced, so that the weight of the entire pultrusion material 10 can be reduced.

Further, according to Embodiment 1, by reinforcing a part farthest from the intersection P, it is possible to reinforce a part where stress due to bending moment to the pultrusion material 10 centered on the intersection P becomes larger. In particular, in a case where the pultrusion material 10 is formed in an H shape, it is possible to more suitably reinforce the tip portion where the stress due to the bending moment to the pultrusion material 10 becomes larger. For this reason, it is possible to more suitably perform reinforcement against a load.

Embodiment 2

Figure 5:
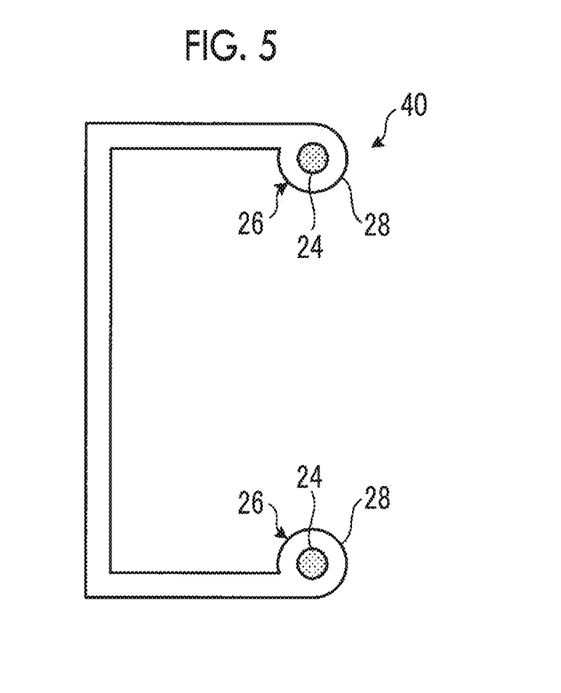
FIG. 5 is a sectional view schematically showing an example of a composite material according to Embodiment 2.

Next, a pultrusion material 40 according to Embodiment 2 will be described with reference to FIG. 5. In Embodiment 2, in order to avoid overlapping description, portions different from those in Embodiment 1 will be described, and portions having the same configurations as in Embodiment 1 will be described with being denoted by the same reference numerals. FIG. 5 is a sectional view schematically showing an example of a composite material according to Embodiment 2.

As shown in FIG. 5, the pultrusion material 40 of Embodiment 2 is formed in a concave shape in a cross section orthogonal to the longitudinal direction. The pultrusion material 40 having a concave shape includes the plurality of fiber sheets 20 and the core materials 24, similar to Embodiment 1. The fiber sheet 20 and the core material 24 are the same as those in Embodiment 1, and therefore, description thereof is omitted.

The reinforced part 26 which is formed in the pultrusion material 40 is provided at each of two end portions which are free ends of the pultrusion material 40 having a concave shape. The reinforced part 26 is also the same as that in Embodiment 1 except that a position where the reinforced part 26 is provided in the pultrusion material 40 is different from that in Embodiment 1, and therefore, description thereof is omitted.

As described above, also in Embodiment 2, the fiber direction of each of the reinforcing fibers which are included in the core material 24 can be oriented along the load direction, and therefore, a load which is applied to the reinforced part 26 can be adequately received by the core material 24.

Embodiment 3

Figure 6:
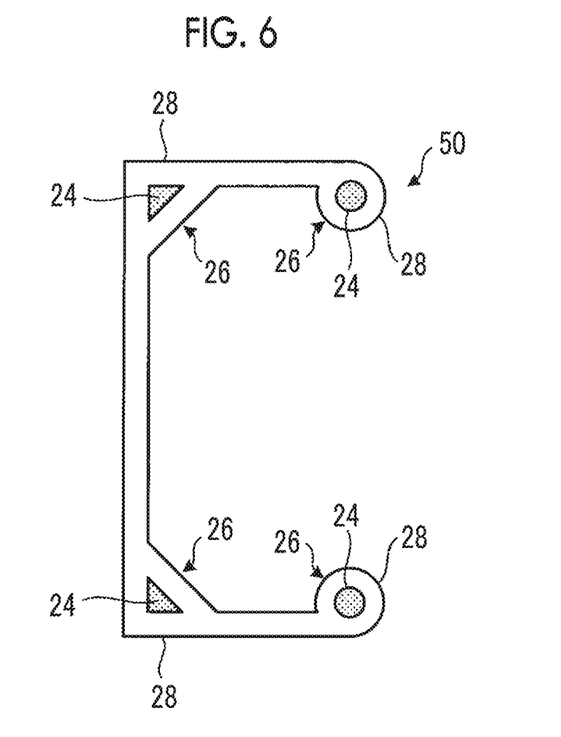
FIG. 6 is a sectional view schematically showing an example of a composite material according to Embodiment 3.

Next, a pultrusion material 50 according to Embodiment 3 will be described with reference to FIG. 6. Also in Embodiment 3, in order to avoid overlapping description, portions different from those in Embodiments 1 and 2 will be described, and portions having the same configurations as in Embodiments 1 and 2 will be described with being denoted by the same reference numerals. FIG. 6 is a sectional view schematically showing an example of a composite material according to Embodiment 3.

As shown in FIG. 6, the pultrusion material 50 of Embodiment 3 is formed in a concave shape in a cross section orthogonal to the longitudinal direction. The pultrusion material 50 having a concave shape includes the plurality of fiber sheets 20 and the core materials 24, similar to Embodiment 1. The fiber sheet 20 and the core material 24 are the same as those in Embodiment 1, and therefore, description thereof is omitted.

The reinforced part 26 which is formed in the pultrusion material 50 is provided at each of two end portions which are free ends of the pultrusion material 50 having a concave shape, and the reinforced part 26 is also provided at each of two bent corner portions of the pultrusion material 50 having a concave shape. The reinforced part 26 is also the same as that in each of Embodiments 1 and 2 except that a position where the reinforced part 26 is provided in the pultrusion material 50 is different from that in each of Embodiments 1 and 2, and therefore, description thereof is omitted.

As described above, also in Embodiment 3, the fiber direction of each of the reinforcing fibers which are included in the core material 24 can be oriented along the load direction, and therefore, a load which is applied to the reinforced part 26 can be adequately received by the core material 24.

Embodiment 4

Figure 7:
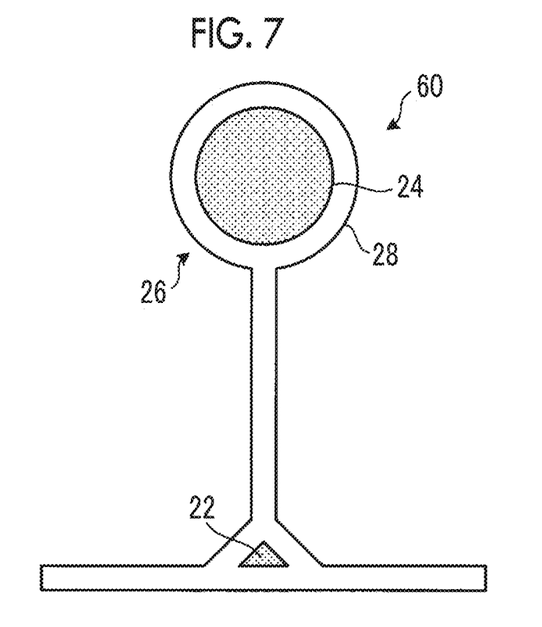
FIG. 7 is a sectional view schematically showing an example of a composite material according to Embodiment 4.

Next, a pultrusion material 60 according to Embodiment 4 will be described with reference to FIG. 7. Also in Embodiment 4, in order to avoid overlapping description, portions different from those in Embodiments 1 to 3 will be described, and portions having the same configurations as in Embodiments 1 to 3 will be described with being denoted by the same reference numerals. FIG. 7 is a sectional view schematically showing an example of a composite material according to Embodiment 4.

As shown in FIG. 7, the pultrusion material 60 of Embodiment 4 is formed in a T shape in a cross section orthogonal to the longitudinal direction. The pultrusion material 60 having a T shape includes the plurality of fiber sheets 20, the gap material 22, and the core material 24, similar to Embodiment 1. The fiber sheet 20, the gap material 22, and the core material 24 are the same as those in Embodiment 1, and therefore, description thereof is omitted.

The reinforced part 26 which is formed in the pultrusion material 60 is provided at a tip portion which is a free end projecting from one surface side of a portion which is one straight side of the pultrusion material 60 having a T shape. The reinforced part 26 is also the same as that in each of Embodiments 1 to 3 except that a position where the reinforced part 26 is provided in the pultrusion material 60 is different from that in each of Embodiments 1 to 3, and therefore, description thereof is omitted.

As described above, also in Embodiment 4, the fiber direction of each of the reinforcing fibers which are included in the core material 24 can be oriented along the load direction, and therefore, a load which is applied to the reinforced part 26 can be adequately received by the core material 24.

REFERENCE SIGNS LIST

10: pultrusion material
20: fiber sheet

22: gap material
24: core material (core part)
26: reinforced part
28: covering part
40: pultrusion material (Embodiment 2)
50: pultrusion material (Embodiment 3)
60: pultrusion material (Embodiment 4)
100: pultrusion device
110: fiber sheet supply unit
112: resin pool
124: core material supply unit
140: molding tool
141: tool main body
142: core part guide part
143: covering part guide part

The invention claimed is:

1. A composite material formed by drawing fiber sheets, the composite material comprising:
   a reinforced part which is a part reinforced against a load acting in a load direction, the load direction being a longitudinal direction of the composite material,
   wherein the reinforced part includes
   a core part which includes reinforcing fibers in which a fiber direction is oriented along the load direction, and is provided to extend along the load direction, and
   a covering part formed by covering a periphery of the core part with a part of the fiber sheets constituting the composite material, the part of the fiber sheets including reinforcing fibers oriented along a direction different from the longitudinal direction,
   wherein the core part is wound by the part of the fiber sheets, and
   wherein, in a cross section of the composite material taken along a plane orthogonal to the longitudinal direction, the reinforced part is a part farthest from a centroid of the cross section.

2. The composite material according to claim 1, wherein when in a cross section taken along a plane orthogonal to the load direction, a neutral axis extending in a predetermined direction is set to be a first neutral axis and a neutral axis extending in a direction orthogonal to the first neutral axis is set to be a second neutral axis,
   the reinforced part is a part farthest from an intersection of the first neutral axis and the second neutral axis.

3. The composite material according to claim 1, wherein the reinforced part is provided in at least one of a tip portion which is a free end and a corner portion which is bent, in a cross section taken along a plane orthogonal to the load direction.

4. A pultrusion method of drawing fiber sheets in a drawing direction to form a composite material having a reinforced part which is a part reinforced against a load acting in a load direction, the reinforced part including
   a core part which includes reinforcing fibers and is provided to extend along the load direction, and
   a covering part formed by covering a periphery of the core part with a part of the fiber sheets constituting the composite material, the part of the fiber sheets including reinforcing fibers oriented along a direction different from the load direction,
   the pultrusion method comprising:
   a pultrusion step of forming the composite material having the reinforced part, by drawing the reinforcing fibers and the fiber sheets along the drawing direction which is the same direction as the load direction,
   wherein the pultrusion step, includes forming the core part by bundling the reinforcing fibers, and winding the part of the fiber sheets around an entire periphery of the core part.

* * * * *